US012730485B2

(12) United States Patent
Liu et al.

(10) Patent No.: US 12,730,485 B2
(45) Date of Patent: Sep. 8, 2026

(54) DISPLAY ASSEMBLY AND ELECTRONIC APPARATUS

(71) Applicant: LENOVO (SINGAPORE) PTE. LTD., Singapore (SG)

(72) Inventors: Yalu Liu, Yokohama (JP); Takayuki Morino, Yokohama (JP); Haonan Xiao, Yokohama (JP); Daisuke Takahashi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 103 days.

(21) Appl. No.: 18/936,885

(22) Filed: Nov. 4, 2024

(65) Prior Publication Data

US 2025/0231595 A1 Jul. 17, 2025

(30) Foreign Application Priority Data

Jan. 17, 2024 (JP) ................................ 2024-005527

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
None
See application file for complete search history.

(56) References Cited

U.S. PATENT DOCUMENTS 9,348,450 B1 * 5/2016 Kim .................... H04M 1/0268
10,268,245 B2 * 4/2019 Lin ...................... G06F 1/1616
10,550,880 B2 * 2/2020 Hsu ...................... E05D 11/082
10,564,681 B2 * 2/2020 Siddiqui ............... G06F 1/1656
10,817,030 B2 * 10/2020 Pelissier ............... G06F 1/1641
11,044,825 B1 * 6/2021 Han ...................... G06F 1/1652
11,202,382 B2 * 12/2021 Feng .................... H05K 5/0086
11,550,367 B2 * 1/2023 Lin ...................... G06F 1/1681
11,706,886 B2 * 7/2023 Wu ..................... H05K 5/0217 361/807
11,768,524 B2 * 9/2023 Siddiqui ............... G06F 1/1618 361/679.01
12,061,499 B2 * 8/2024 Schwartzel ........... G06F 1/1652
12,130,668 B2 * 10/2024 Liu ......................... G09F 9/301
12,181,935 B2 * 12/2024 Hsiang .................. G06F 1/1624

(Continued)

FOREIGN PATENT DOCUMENTS

JP 2024089488 A * 7/2024 .......... G06F 1/1616

*Primary Examiner* — Xanthia C Relford
*Assistant Examiner* — Xanthia C Cunningham
(74) *Attorney, Agent, or Firm* — SHIMOKAJI IP

(57) ABSTRACT

A display assembly includes: a first plate; a second plate that is rotatable relative to the first plate into a first posture in which the second plate is disposed relative to the first plate with surface normal directions of the first and second plates placed side by side, and a second posture in which the first plate and the second plate are stacked with the surface normal directions overlapping; a sheet shaped display extending between the first and second plates; and a sheet member having a first end supported between a surface of the first edge and a rear face of the display and a second end supported between a surface of the second edge and the rear face of the display, thus supporting the rear face of the bendable region of the display while spanning a gap between the first and second plates in the first posture.

8 Claims, 10 Drawing Sheets

(56) References Cited

U.S. PATENT DOCUMENTS

| | | | | |
|---|---|---|---|---|
| 12,274,014 | B2 * | 4/2025 | Li | H05K 5/0226 |
| 2014/0042293 | A1 * | 2/2014 | Mok | G06F 1/1652<br>248/682 |
| 2015/0233162 | A1 * | 8/2015 | Lee | H04M 1/022<br>16/223 |
| 2016/0295709 | A1 * | 10/2016 | Ahn | H04M 1/022 |
| 2018/0292860 | A1 * | 10/2018 | Siddiqui | H04M 1/0268 |
| 2019/0301215 | A1 * | 10/2019 | Siddiqui | E05D 5/04 |
| 2020/0073440 | A1 * | 3/2020 | Watamura | G06F 1/1683 |
| 2020/0201400 | A1 * | 6/2020 | Jan | G06F 1/1652 |
| 2021/0026417 | A1 * | 1/2021 | Morino | G06F 1/1683 |
| 2021/0397226 | A1 * | 12/2021 | Siddiqui | G06F 1/1616 |
| 2022/0287189 | A1 * | 9/2022 | Kim | H05K 5/0226 |
| 2022/0338362 | A1 * | 10/2022 | Morino | G06F 1/1641 |

* cited by examiner

DISPLAY ASSEMBLY AND ELECTRONIC APPARATUS

BACKGROUND OF THE INVENTION

Field of the Invention

The present invention relates to a display assembly and an electronic apparatus.

Description of the Related Art

Recently electronic apparatuses (e.g., PCs and smartphones) that have a touch-panel type liquid crystal display and do not have a physical keyboard have rapidly spread. The display of this type of electronic apparatuses is desirably large when in use, but is desired to be compact when not in use. Then, an electronic apparatus has been proposed, which includes a flexible display such as an organic electro luminescence (EL), and is configured so that not only the chassis but also the display is foldable (see Japanese Unexamined Patent Application Publication No. 2022-166990).

SUMMARY OF THE INVENTION

When the flexible display as described above is opened to 180 degrees, its rear face is desirably supported by a plane that has a high degree of flatness with few steps. One of the reasons is that if the pen or fingertip senses the steps during the touch operation, the user's operational feeling will deteriorate. However, mechanical components such as hinge device components may be located on the rear face at the bendable region of the display, and it is difficult to completely eliminate steps from these components. Also, with or without a touch panel, flexible displays are very thin and vulnerable to impact. For these reasons, if a pen or other foreign object is dropped onto the bendable region of the display, the display may be damaged due to the impact.

To solve the above problems of the conventional techniques, the present invention aims to provide a display assembly and an electronic apparatus capable of supporting the bendable display stably.

A display assembly according to the first aspect of the present invention includes: a first plate having a first edge; a second plate having a second edge, the second plate being rotatable relative to the first plate to have a first posture in which the second plate is disposed relative to the first plate with surface normal directions of the first and second plates placed side by side to the left and right, and a second posture in which the first plate and the second plate are stacked with the surface normal directions overlapping, the second plate being disposed with a gap between the second edge and the first edge in the first posture; a display having a sheet shape extending between the first plate and the second plate, the display having: a first region placed close to the first plate and fixed to a part of a surface of the first plate excluding at least the first edge; a second region placed close to the second plate and fixed to a part of a surface of the second plate excluding at least the second edge; and a bendable region between the first region and the second region, the bendable region spanning the gap; and a sheet member having a first end supported between a surface of the first edge and a rear face of the display and a second end supported between a surface of the second edge and the rear face of the display, thus supporting the rear face of the bendable region of the display while spanning the gap in the first posture.

An electronic apparatus according to the second aspect of the present invention includes: a first chassis; a second chassis adjacent to the first chassis, the second chassis being rotatable relative to the first chassis to have a first posture in which the second chassis is disposed relative to the first chassis with surface normal directions of the first and second chassis disposed side by side to the left and right, and a second posture in which the first chassis and the second chassis are stacked with the surface normal directions overlapping; a first plate having a first edge and supported by the first chassis; a second plate supported by the second chassis, and having a second edge, the second edge being disposed with a gap from the first edge in the first posture; a display having a sheet shape extending between the first plate and the second plate, the display having: a first region placed close to the first plate and fixed to a part of a surface of the first plate excluding at least the first edge; a second region placed close to the second plate and fixed to a part of a surface of the second plate excluding at least the second edge; and a bendable region between the first region and the second region, the bendable region spanning the gap, so that the bendable region is bent with relative rotation between the first chassis and the second chassis; and a sheet member having a first end supported between a surface of the first edge and a rear face of the display and a second end supported between a surface of the second edge and the rear face of the display, thus supporting the rear face of the bendable region of the display while spanning the gap in the first posture.

The above-described aspects of the present invention support a bendable display stably.

DETAILED DESCRIPTION OF THE INVENTION

Figure 1:
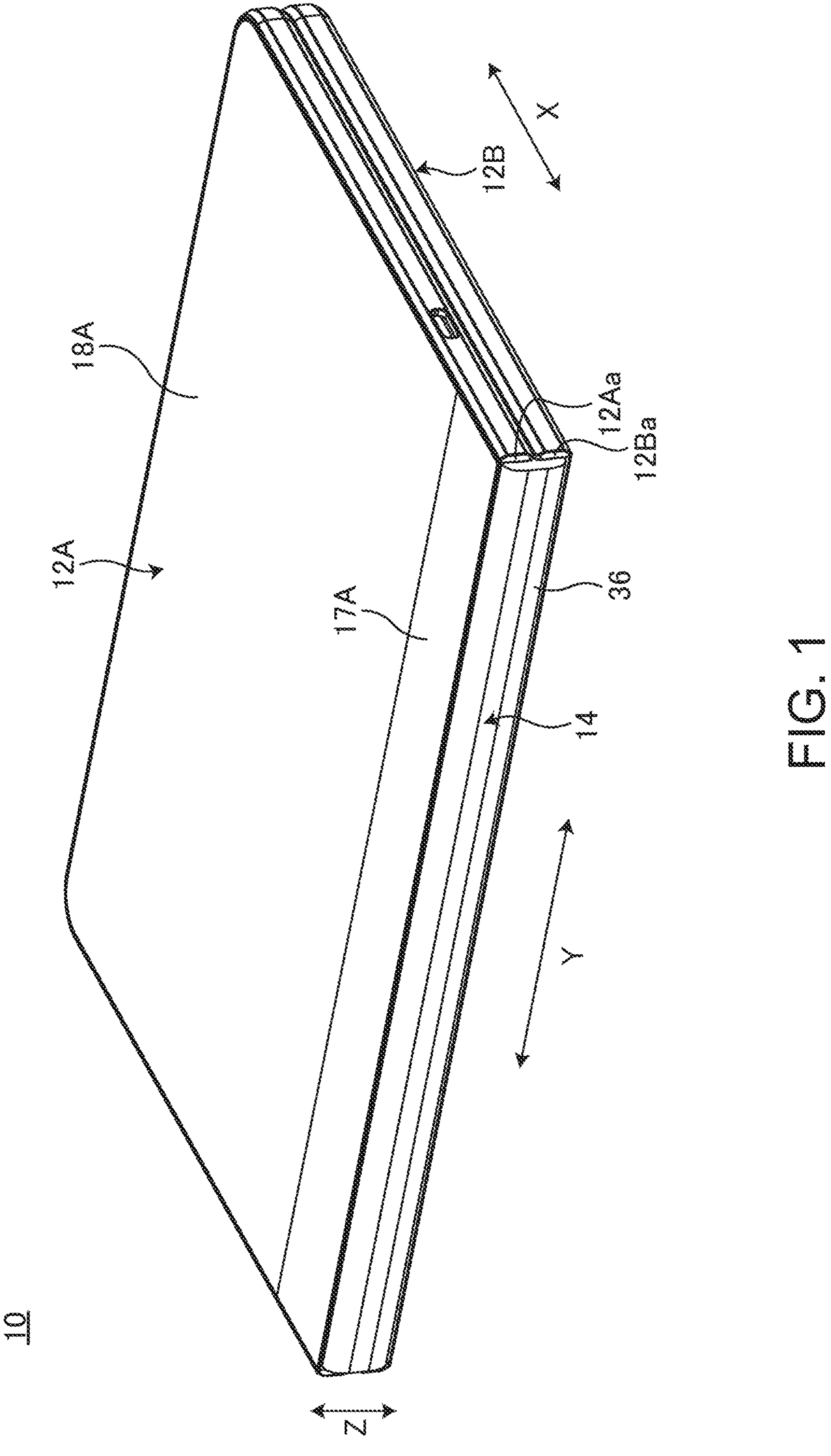
FIG. 1 is a schematic perspective view of an electronic apparatus according to one embodiment that is closed to the 0-degree posture.

Referring to the drawings, the following describes a display assembly and an electronic apparatus according to the present invention in details by way of preferable embodiments.

Figure 2:
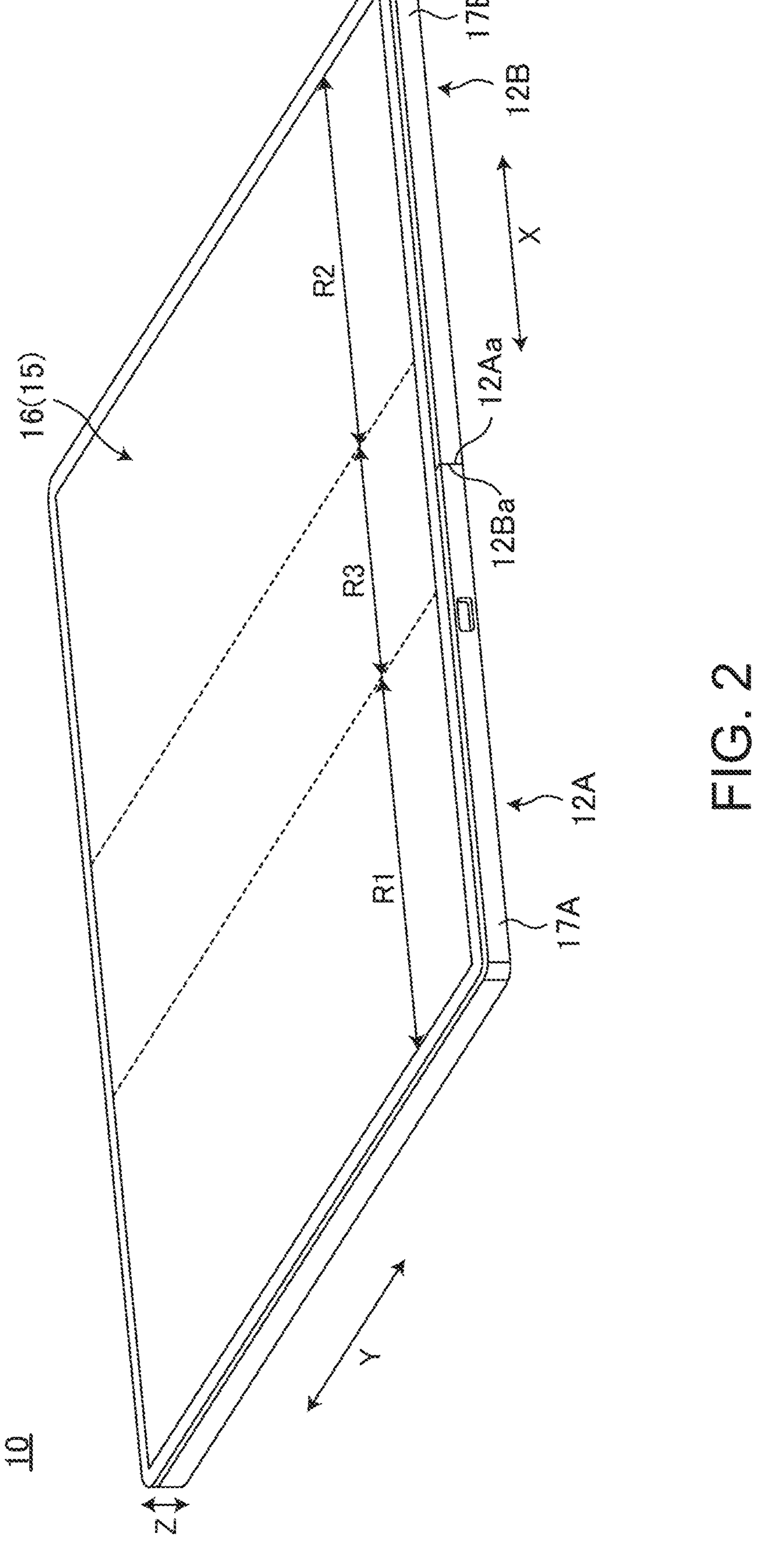
FIG. 2 is a perspective view schematically illustrating the electronic apparatus of FIG. 1 that is opened to the 180-degree posture.
Figure 3:
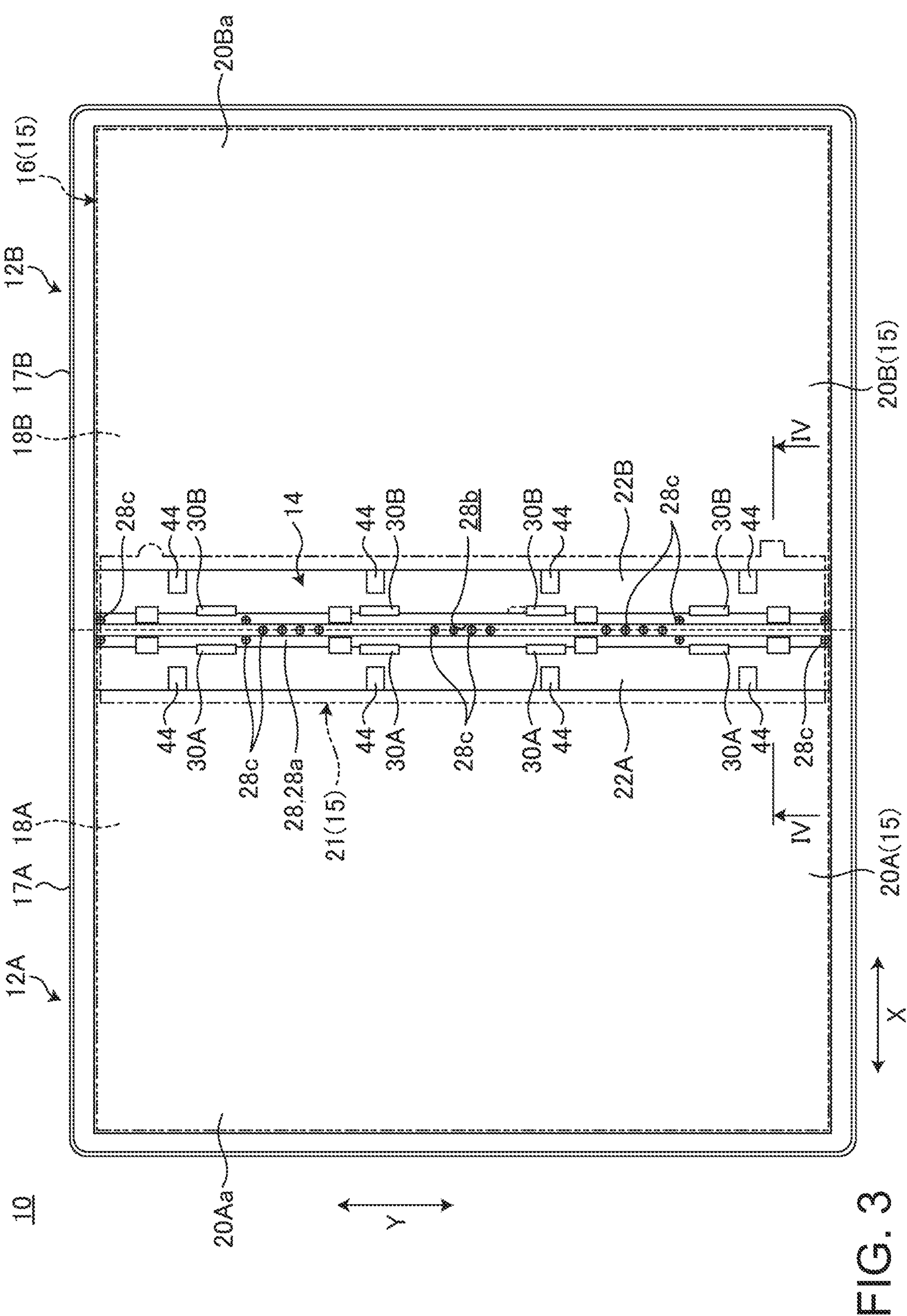
FIG. 3 is a schematic plan view of the electronic apparatus of FIG. 2.

FIG. 1 is a schematic perspective view of an electronic apparatus 10 according to one embodiment that is closed to the 0-degree posture. FIG. 2 is a perspective view schematically illustrating the electronic apparatus 10 of FIG. 1 that is opened to the 180-degree posture. FIG. 3 is a schematic plan view of the electronic apparatus 10 of FIG. 2. In FIG. 3, only the outlines of a display 16 and a sheet member 21 are shown by two-dot chain lines.

As illustrated in FIG. 1 to FIG. 3, the electronic apparatus 10 includes a first chassis 12A, a second chassis 12B, a hinge device 14, and a display assembly 15. The electronic apparatus 10 of the present embodiment is described by way of an example of a tablet PC or a laptop PC that is foldable like a book. The electronic apparatus 10 may be other apparatuses such as a smartphone, and a portable game machine.

The chassis 12A and 12B are placed adjacent to each other. Each of the chassis 12A and 12B appropriately mounts electronic components such as a motherboard on which a CPU is mounted, a battery device, an antenna module, and a communication module.

The first chassis 12A includes a frame member 17A and a cover member 18A. The frame member 17A is a rectangular frame member with standing walls on three sides except for an adjacent end Aa, which is adjacent to the second chassis 12B. The cover member 18A is a plate member that closes the rear opening of the frame member 17A. Similarly, the second chassis 12B includes a frame member 17B and a cover member 18B. The frame member 17B has standing walls on three sides other than an adjacent end 12Ba adjacent to the first chassis 12A, and the cover member 18B closes the rear opening of the frame member 17B. The surface openings of the frame members 17A and 17B are closed by a display assembly 15.

For instance, these members 17A, 17B, 18A, and 18B include metal members made of stainless steel, magnesium, and aluminum or include fiber reinforced resin plates containing reinforcement fibers such as carbon fibers.

The hinge device 14 connects the chassis 12A and 12B in a relatively rotatable manner between the 0-degree posture and the 180-degree posture. The hinge device 14 also functions as a spine that hides the gap between the adjacent ends 12Aa and 12Ba, having the gap in the 0-degree posture illustrated in FIG. 1. The display assembly 15 extends over the chassis 12A and 12B.

For the electronic apparatus 10, the following refers to the direction of placing the chassis 12A and 12B side by side as X direction, the direction orthogonal to X direction and along the adjacent ends 12Aa and 12Ba as Y direction, and the thickness direction of the chassis 12A and 12B as Z direction. For the angular posture between the chassis 12A and 12B, the following refers to the stacking state in which the chassis are overlaid in their surface normal direction as a 0-degree posture (see FIG. 1), and the state of placing the chassis side by side in the direction perpendicular to their surface normal direction (X direction) as a 180-degree posture (see FIG. 2 and FIG. 3). The postures between 0 degree and 180 degrees may be referred to with corresponding angles. For example, the posture where the surface normal directions of the chassis 12A and 12B are orthogonal to each other is a 90-degree posture. These angles are for convenience of explanation, and the actual product may have an angular position that deviates slightly from the exact angular position indicated by the angle.

Figure 4:
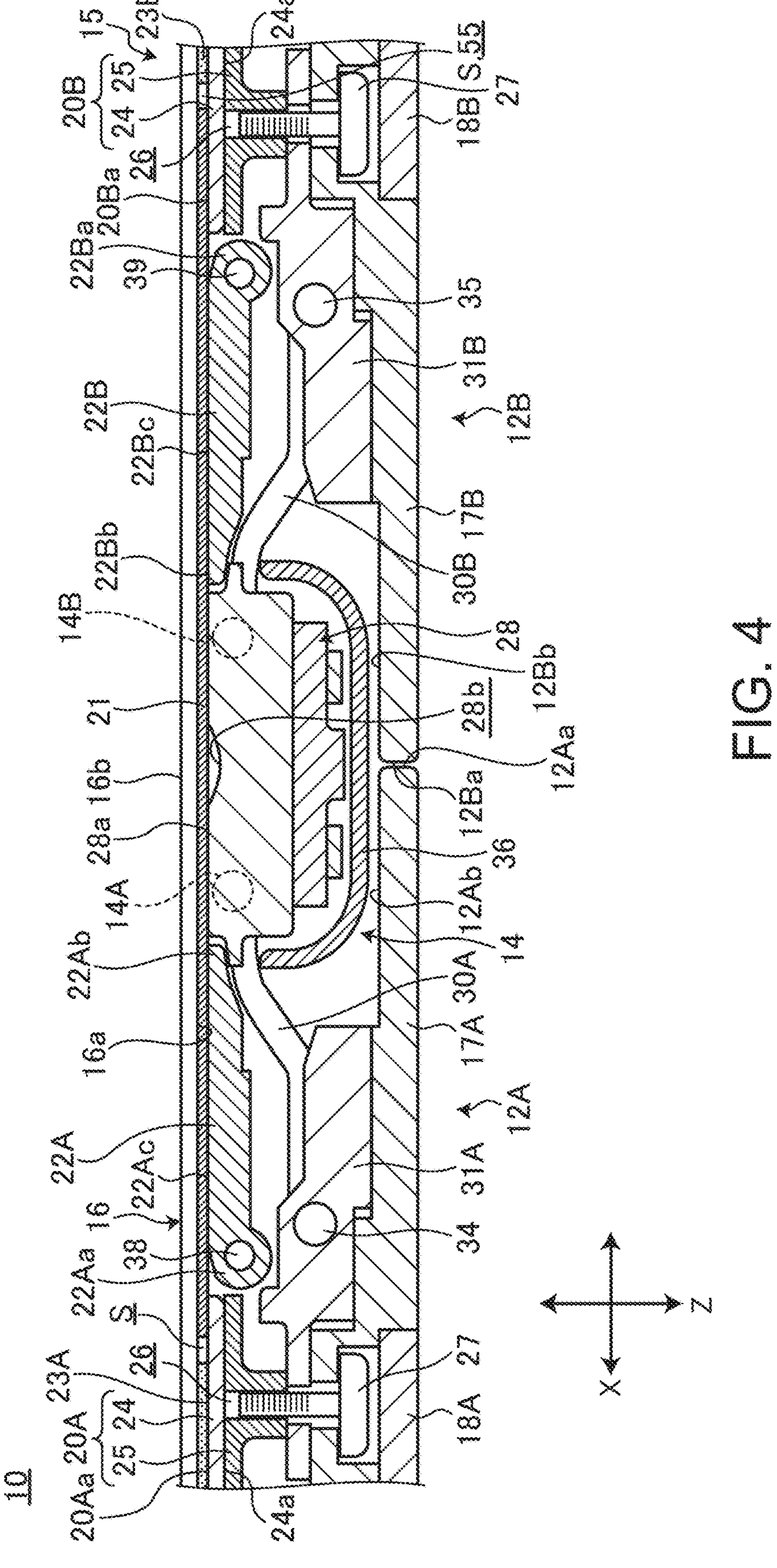
FIG. 4 is a schematic cross-sectional view along the line IV-IV in FIG. 3.
Figure 5:
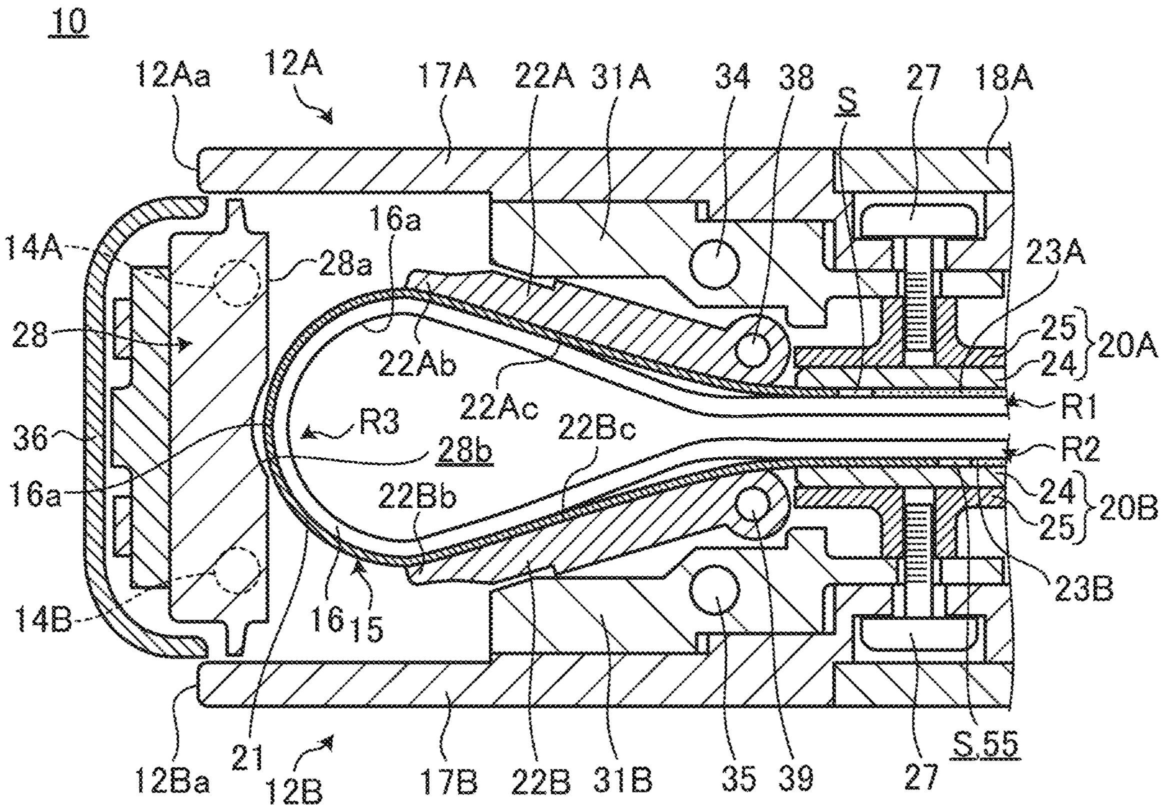
FIG. 5 is a schematic cross-sectional view of the electronic apparatus of FIG. 3 that is in the 0-degree posture.

FIG. 4 is a schematic cross-sectional view along the line IV-IV in FIG. 3. FIG. 5 is a schematic cross-sectional view of the electronic apparatus 10 of FIG. 4 that is in the 0-degree posture.

In the 0-degree posture illustrated in FIG. 1 and FIG. 5, the chassis 12A and 12B are folded to be overlapped on top of one another. The display assembly 15 includes a display 16, and the display 16 includes a touch-operable, flexible paper-like display including organic electro luminescence (EL). The display 16 has a region R1 on the first chassis 12A and a region R2 on the second chassis 12B, as illustrated in FIG. 2. In the 0-degree posture, these regions R1 and R2 face each other, and a bendable region R3 that is a boundary region between the regions R1 and R2 is bent in an arc shape. In the 180-degree posture illustrated in FIG. 2, the chassis 12A and 12B are placed side by side to the left and right. In this posture, the display 16 has a single flat plate shape as a whole, where the regions R1 and R2 and the bendable region R3 are placed side by side on the XY plane (see also FIG. 4).

The display assembly 15 includes the display 16, a first plate 20A and a second plate 20B, and the sheet member 21. Of the display 16, the region R1 is relatively fixed to the first chassis 12A, and the region R2 is relatively fixed to the second chassis 12B. Specifically, the rear face 16*a* of the region R1 is fixed to the first chassis 12A via the first plate 20A, and the rear face 16*a* of the region R2 is fixed to the second chassis 12B via the second plate 20B. The first plate 20A is adjacent to a first support plate 22A, and the second plate 20B is adjacent to a second support plate 22B (see FIG. 3 and FIG. 4).

As illustrated in FIG. 3 through FIG. 5, these plates 20A and 20B are placed on the left and the right of the hinge device 14, and have their surfaces 20Aa and 20Ba that support the rear face 16*a* of the display 16. The rear face 16*a* of the display 16 is adhesively fixed in the region R1 to the surface 20Aa of the first plate 20A with a first adhesive 23A, and is adhesively fixed in the region R2 to the surface 20Ba of the second plate 20B with a second adhesive 23B. For instance, these adhesives 23A and 23B may be double-sided adhesive tape.

For instance, the plates 20A and 20B each include a base plate 24 and a metal frame 25. For instance, the base plate 24 is a carbon fiber reinforced resin plate prepared by impregnating carbon fibers with a matrix resin such as epoxy resin. For instance, the metal frame 25 includes magnesium alloy, and is fixed to the outer edge of the rear face 24*a* of the base plate 24.

These plates 20A and 20B are made of carbon-fiber reinforced resin, and thus may have a high degree of flatness, thinness, and light weight. For carbon-fiber reinforced resin, however, there are concerns that the carbon fiber in the powdery form may fall off from the outer end face (edge), and its shape forming and threading are also difficult. Thus, the plates 20A and 20B each include the metal frame 25 that surrounds the peripheral end face and the outer edges of the rear face 24*a*. The plate 20A (20B) is fixed to the frame member 17A (17B) of the chassis 12A (12B) by fastening a screw 27 into a hole 26 in the metal frame 25. The plates 20A and 20B may be made of a metal material or a resin material, instead of carbon-fiber reinforced resin. In this case, the metal frame 25 may be omitted.

The bendable region R3 of the display 16 is movable relative to the chassis 12A and 12B. In the 180-degree posture, the rear face 16*a* of the bendable region R3 is supported by a hinge base 28 and the support plates 22A and 22B via the sheet member 21 (see FIG. 4). In the 0-degree posture, the bendable region R3 is bent like an arc. A part of the rear face 16*a* is supported by the support plates 22A and 22B via the sheet member 21, and most of the rear face 16*a* is separated from the hinge device 14 (see FIG. 5).

As illustrated in FIG. 3 through FIG. 5, the hinge device 14 of the present embodiment has the hinge base 28, a first link arm 30A and a second link arm 30B, a first bracket 31A and a second bracket 31B, and the first support plate 22A and a second support plate 22B.

The hinge base 28 is located across the adjacent ends 12Aa and 12Ba of the chassis 12A and 12B, and extends along the adjacent ends 12Aa and 12Ba over substantially the entire length in Y direction. The hinge base 28 is a block component made of metal such as aluminum. The hinge base 28 is supported by two hinge shafts 14A and 14B that are aligned in X direction in the 180-degree posture. The hinge base 28 has a surface that serves as a support face 28*a* to support the rear face 16*a* of the bendable region R3 in the 180-degree posture. This support face 28*a* has a groove 28*b* formed in the center in the width direction (X direction). The groove 28*b* extends over the entire length or substantially entire length of the hinge base 28 in the longitudinal direction (Y direction). The groove 28*b* provides a space to prevent the support face 28*a* from crushing the arc-shaped bendable region R3 in the 0-degree posture.

The first hinge shaft 14A supports a first end of the first link arm 30A to be rotatable around the shaft. The second hinge shaft 14B supports a first end of the second link arm 30B to be rotatable around the shaft. The link arms 30A and 30B have a boomerang-like curved shape that gradually approaches the inner faces 12Ab and 12Bb of the chassis 12A and 12B in the direction away from the hinge shafts 14A and 14B.

A second end of the first link arm 30A is rotatably connected relative to the first bracket 31A using a rotary shaft 34. The first bracket 31A is fixed to the inner face 12Ab of the first chassis 12A using a screw 27, for example. A second end of the second link arm 30B is rotatably connected relative to the second bracket 31B using a rotary shaft 35. The second bracket 31B is fixed to the inner face 12Bb of the second chassis 12B using a screw 27, for example.

A plurality of these link arms 30A and 30B and brackets 31A and 31B are arranged in Y direction, which is the longitudinal direction of the hinge base 28 (see FIG. 3). This allows the hinge base 28 to connect the chassis 12A and 12B in a relatively rotatable manner. The hinge base 28 also internally includes a gear mechanism that synchronizes the rotation motions between the chassis 12A and 12B, and a torque mechanism that applies a predetermined rotational torque to the rotation motions between the chassis 12A and 12B. As illustrated in FIG. 1 and FIG. 4, a spine component 36, which serves as a decorative cover, is attached below the rear face of the hinge base 28. Portions of the link arms 30A and 30B are exposed on the support face 28*a* of the hinge base 28, and further the heads of a plurality of screws 28*c* for fixing the gear mechanism and torque mechanism described above are also exposed (see FIG. 3).

In the 180-degree posture illustrated in FIG. 4, the hinge base 28 supports the rear face 16*a* of the bendable region R3 of the display 16 at the support face 28*a*. In this posture, the hinge base 28 is housed in the chassis 12A and 12B, and is located to span the adjacent ends 12Aa and 12Ba in X direction, these adjacent ends being close to or in contact with each other. In the 0-degree posture illustrated in FIG. 5, the hinge base 28 is located to close the gap between the adjacent ends 12Aa and 12Ba that are largely separated from each other, and serves as the spine of the electronic apparatus 10 folded like a book. In this posture, the spine component 36 exposed to the outermost surface prevents deterioration of the appearance design of the folded electronic apparatus 10 (see FIG. 1). The groove 28*b* of the support face 28*a* faces the bendable region R3 bent in an arc shape, and this suppresses crushing of the bendable region R3.

The support plates 22A and 22B are made of metal such as aluminum, and they are symmetrical in shape. These support plates 22A and 22B are placed to be opposed to the inner faces 12Ab and 12Bb of the chassis 12A and 12B and extend along the adjacent ends 12Aa and 12Ba over substantially the entire length in Y direction.

The first support plate 22A is placed between the first plate 20A and the hinge base 28. The first support plate 22A has an edge 22Aa close to the first plate 20A, and is connected so that this edge 22Aa is rotatable relative to the first bracket 31A via the rotary shaft 38. The first support plate 22A has an edge 22Ab close to the hinge base 28, and this edge is movable relative to the hinge base 28.

The second support plate 22B is placed between the second plate 20B and the hinge base 28. The second support plate 22B has an edge 22Ba close to the second plate 20B, and is connected so that this edge 22Ba is rotatable relative to the second bracket 31B via the rotary shaft 39. The second support plate 22B has an edge 22Bb close to the hinge base 28, and this edge 22Bb is movable relative to the hinge base 28.

The support plates 22A and 22B are movable components that pivot around the rotary shafts 38 and 39 in response to the rotary movement of the chassis 12A and 12B. In the 180-degree posture, the surface 22Ac of the first support plate 22A supports the rear face 16*a* of the display 16 in the bendable region R3. The surface 22Bc of the second support plate 22B supports the rear face 16*a* of the display 16 in the bendable region R3. In angular postures other than 180 degrees, the support plates 22A and 22B keep a gap from the display 16 or are in contact with the display 16 while applying a small force that does not deform the display 16 (see FIG. 5). The support plates 22A and 22B may be configured to support the bendable region R3 of the display 16 also in angular postures other than 180 degrees to correct its shape. In this way, the support plates 22A and 22B stably support the bendable region R3 of the display 16 with a plane when the electronic apparatus has the 180-degree posture, while not interfering with the bending motion of the bendable region R3.

In the 180-degree posture illustrated in FIG. 3 and FIG. 4, the edges of the plates 20A, 20B opposed to the support plates 22A and 22B and the edges 22Aa and 22Ba of the support plates 22A and 22B define a single flat face without any steps. Similarly, the edges 22Ab and 22Bb of the support plates 22A and 22B and the hinge base 28 also define a single flat face without any steps. With this configuration, the electronic apparatus 10 in the 180-degree posture is configured so that the rear face 16*a* of the display 16 forming a single large flat screen is supported by substantially a single flat plate. This suppresses product defects such as curvature, waving, visibility defects, or display defects in the display 16.

Reference numeral 44 in FIG. 3 denotes a slope member protruding from the edge of the plate 20A (20B) opposed to the support plate 22A (22B). This slope member 44 slides against the rear face 16*a* of the display 16 when the display 16 is rotated from the 180-degree posture to the 0-degree posture, and assists in correcting the bendable region R3 into an appropriate shape (straight or curved) according to the rotation angle. The edge 22Ab (22Bb) of the support plate 22A (22B) has recessed to avoid interference of the slope member 44 in the 180-degree posture. The slope member 44 may be omitted.

Note that the display 16 of this embodiment is a touch-operated, flexible paper-like display. In the 180-degree posture, the rear face 16a in the bendable region R3 is supported by the support face 28a of the hinge base 28 and the surfaces 22Ac and 22Bc of the support plates 22A and 22B. The support face 28a, however, has a step due to the groove 28b, and has also several steps due to the screws 28c and others. When performing a touch operation on the display 16, the user may feel such a step on the support face 28a, which is on the rear face of the display 16, through a pen or a fingertip, resulting in a poor operational feel. In particular, the groove 28b extends the entire length of the support face 28a in its longitudinal direction and in the center of the width direction. Therefore, during a touch operation such as tracing the bendable region R3 in X direction, for example, the user may directly sense the step caused by the groove 28b.

Also when the display 16 is not of a touch panel type, it is desirable that the steps on the support face 28a had as little effect on the display 16 as possible. The display 16, which is a flexible display, is thin and vulnerable to impact. For this reason, if the bendable region R3 receives a strong impact from the display surface and if there is a step directly below it, the possibility of a malfunction occurring in the display 16 increases.

Now, a specific configuration example of the display assembly 15 having a configuration to stably support the bendable region R3 of the display 16 will be described.

Figure 6A:
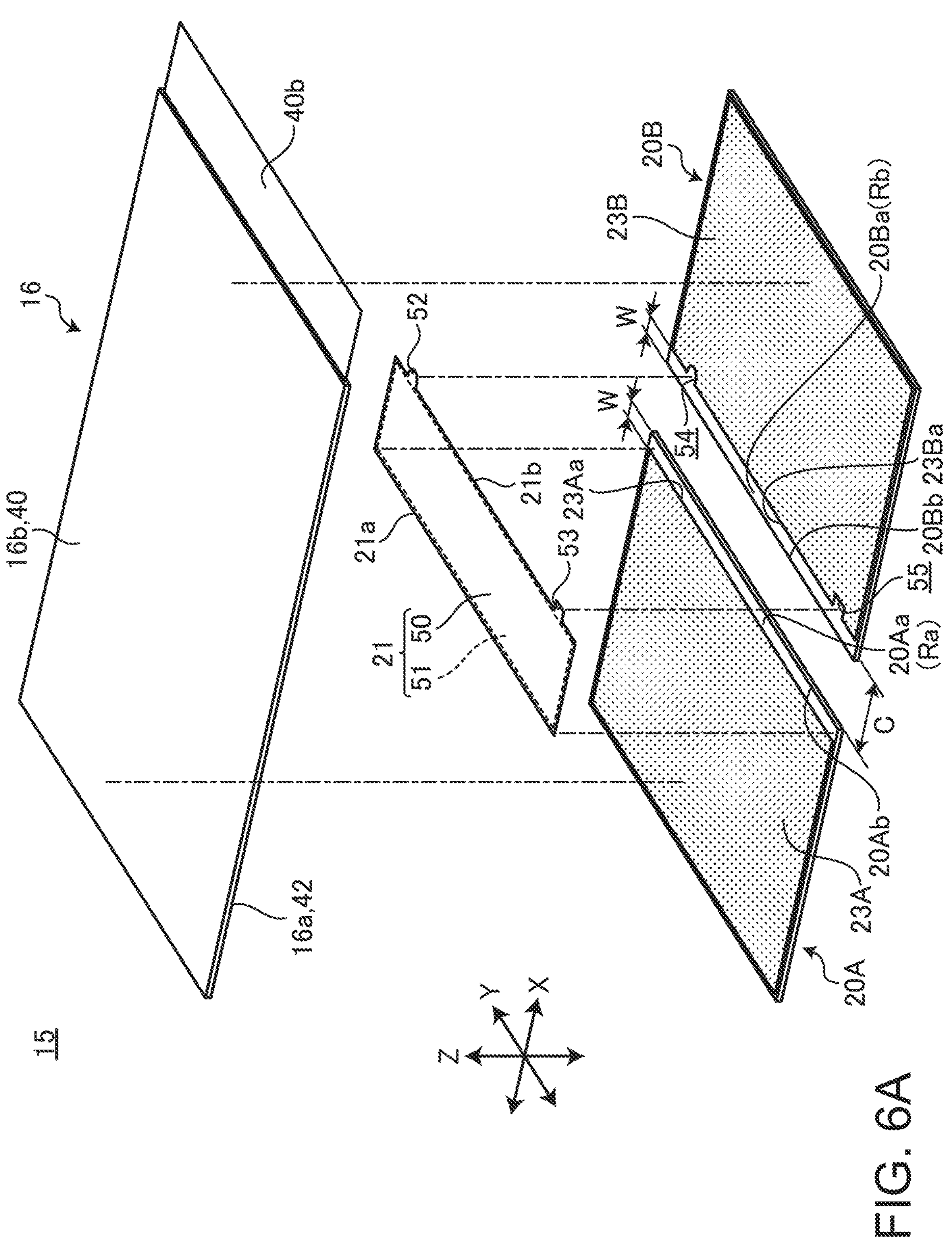
FIG. 6A is a schematic exploded perspective view of a display assembly.
Figure 6B:
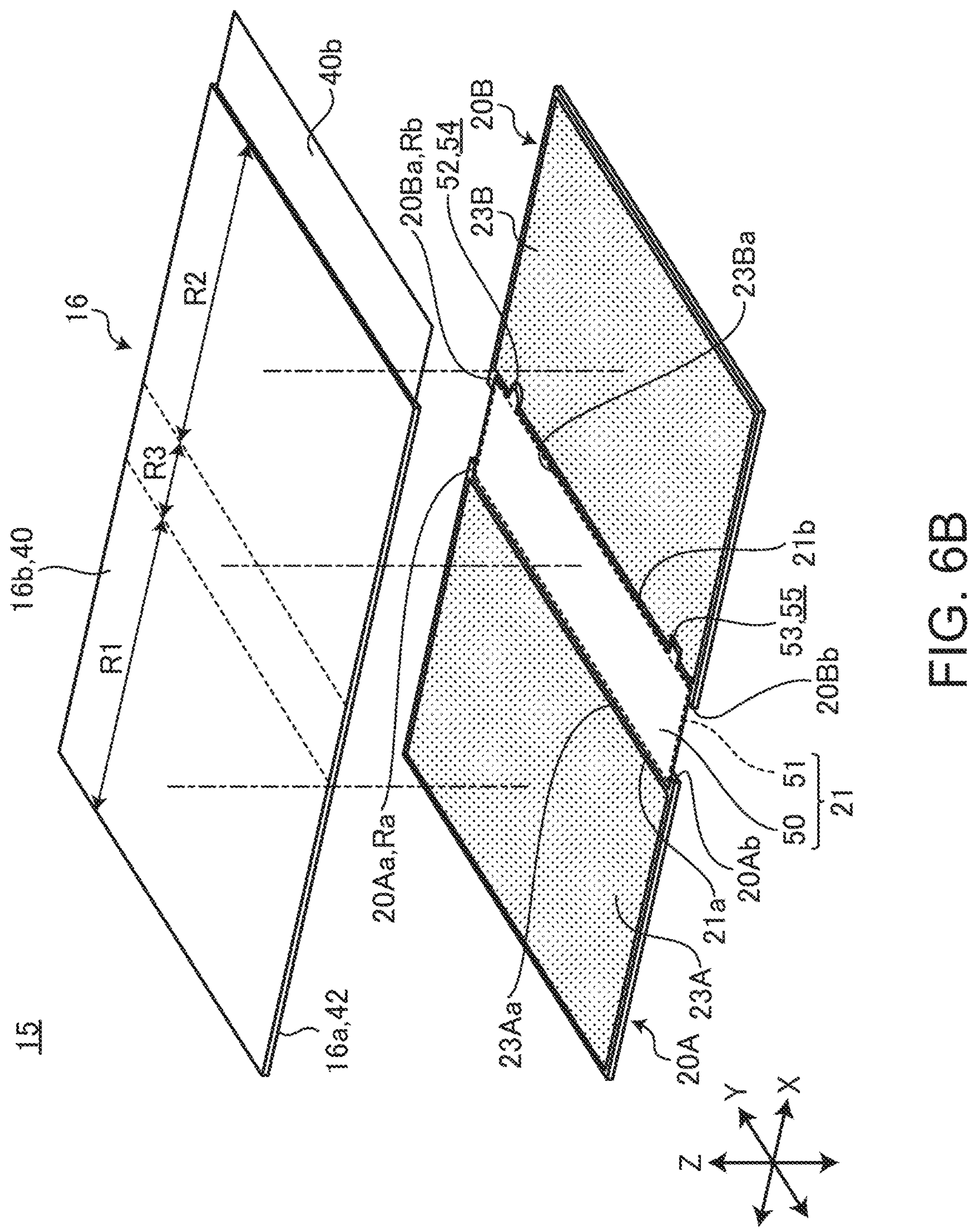
FIG. 6B illustrates the sheet member of FIG. 6A placed on the plates.
Figure 7A:
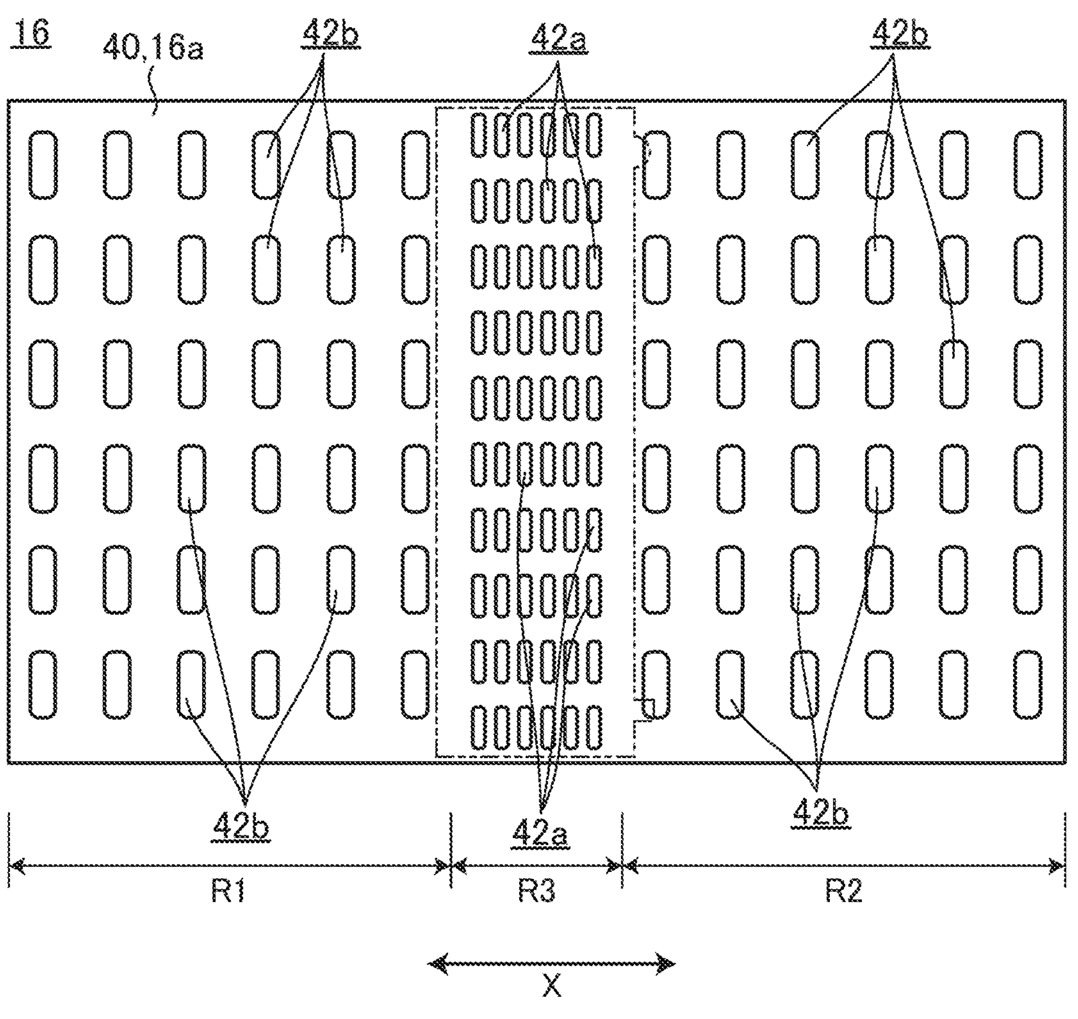
FIG. 7A is a schematic bottom view of the display.
Figure 7B:
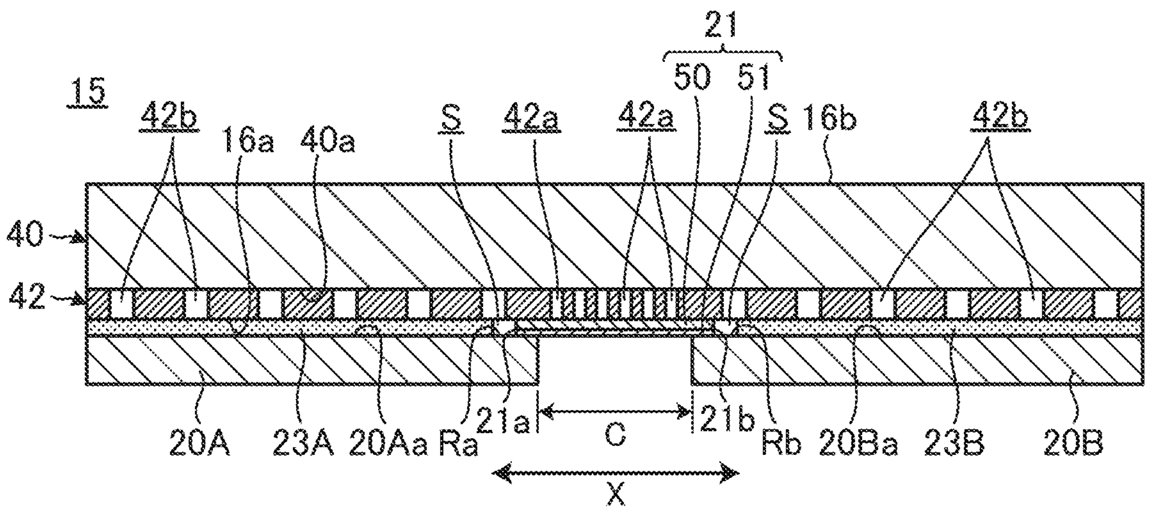
FIG. 7B is a schematic cross-sectional view of the display assembly.
Figure 8:
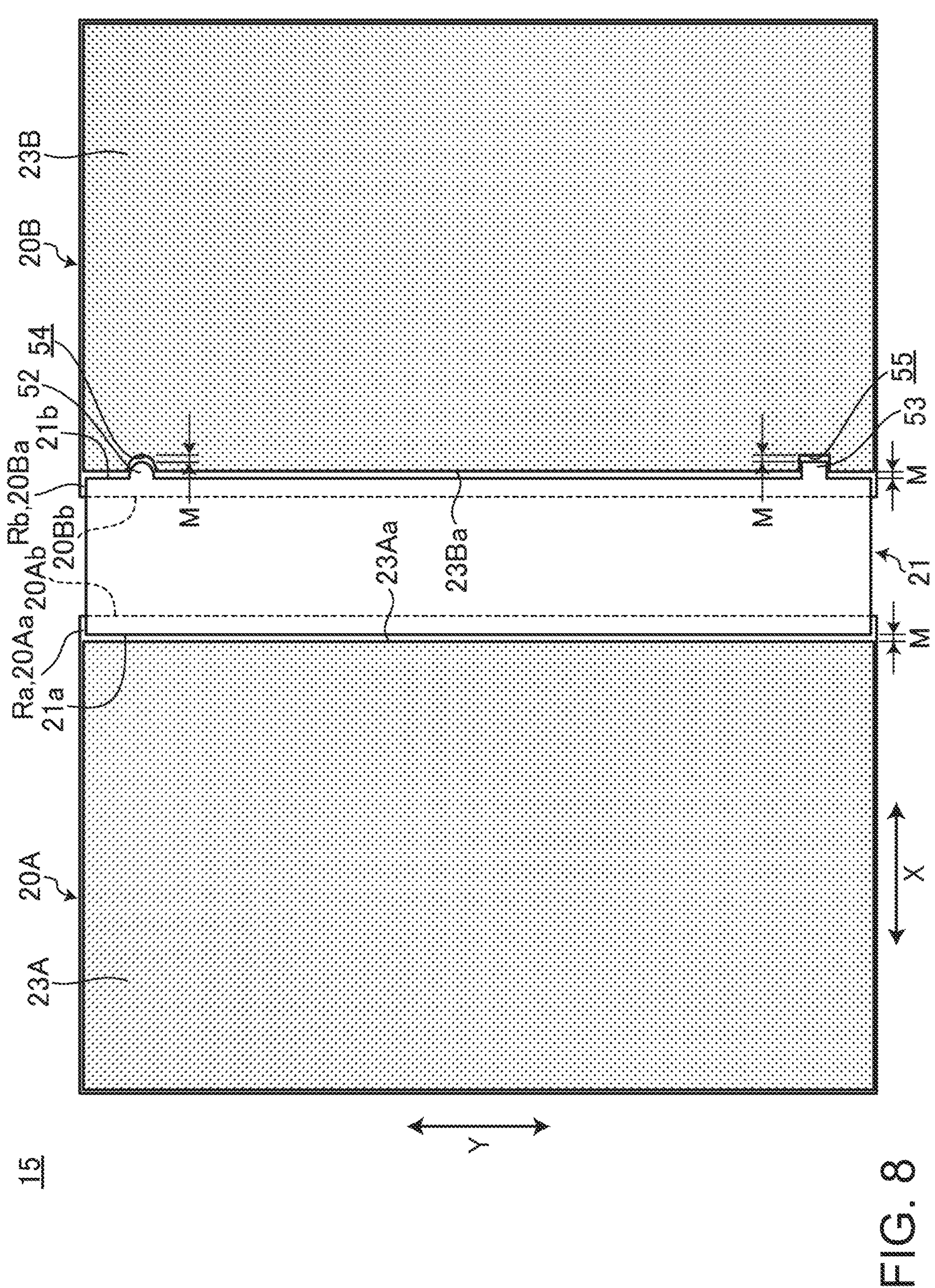
FIG. 8 is a plan view of the sheet member and the plates illustrated in FIG. 6B.
Figure 9:
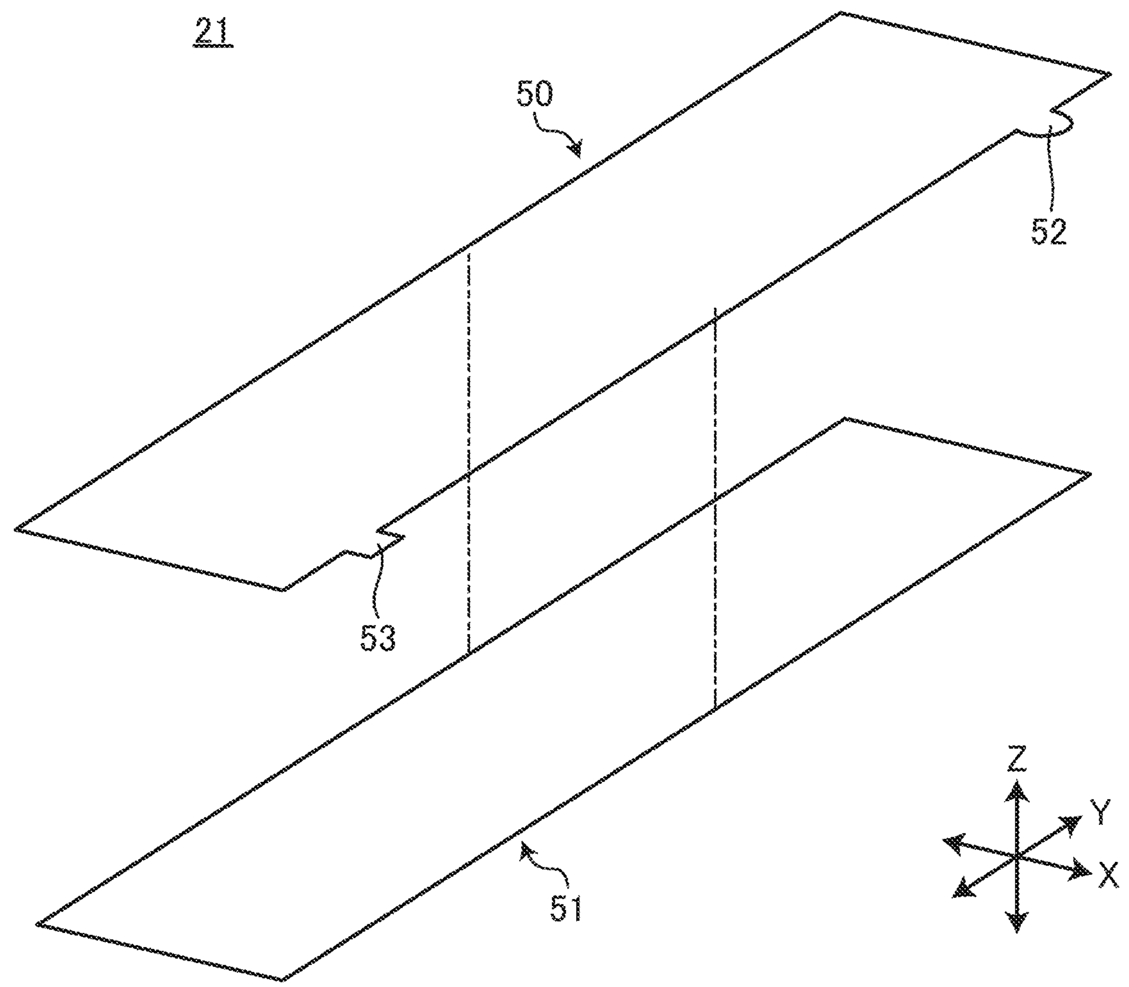
FIG. 9 is a schematic exploded perspective view of the sheet member.

FIG. 6A is a schematic exploded perspective view of the display assembly 15. FIG. 6B illustrates the sheet member 21 of FIG. 6A placed on the plates 20A and 20B. FIG. 7A is a schematic bottom view of the display 16. FIG. 7B is a schematic cross-sectional view of the display assembly 15. FIG. 8 is a plan view of the sheet member 21 and the plates 20A and 20B illustrated in FIG. 6B. FIG. 9 is a schematic exploded perspective view of the sheet member 21.

As illustrated in FIG. 4 through FIG. 6B, the display assembly 15 is configured so that the rear face 16a of regions R1 and R2 of the display 16 is fixed to the plates 20A and 20B, and the rear face 16a of the bendable region R3 is supported by the sheet member 21 that spans the gap C between the plates 20A and 20B.

As illustrated in FIG. 6A through FIG. 7B, the display 16 of this embodiment has a display main body 40 and a rear sheet 42 stacked to the rear face 40a of the display main body 40. The display main body 40 has a display surface 16b of the display 16 that displays videos and images. A touch panel may also be stacked on the display surface 16b. Reference numeral 40b in FIG. 6A denotes wire connected to one edge of the display main body 40.

The rear sheet 42 is fixed to the rear face 40a of the display main body 40 with an adhesive such as double-sided adhesive tape. The rear sheet 42 defines the rear face 16a of the display 16. The rear sheet 42 is a support sheet that supports the display main body 40 and also assists the bending operation. The rear sheet 42 covers the entire rear face 40a of the display main body 40 over the regions R1 and R2. For instance, the rear sheet 42 includes a thin flexible sheet made of stainless steel. For instance, the rear sheet 42 has a thickness of 0.15 mm.

As illustrated in FIG. 7A and FIG. 7B, the rear sheet 42 may include a punched metal sheet or a mesh sheet having a large number of holes 42a and 42b penetrating therethrough. The rear sheet 42 has a larger aperture ratio (aperture area per unit area) of the holes 42a in the bendable region R3 than that of the holes 42b in regions R1 and R2. This ensures that the rear sheet 42 is bent flexibly in the bendable region R3. As a result, the display assembly 15 allows the display 16 to have a stable arc shape during the bending operation. The holes 42b may be omitted in the non-bent regions R1 and R2, but providing the holes 42b there reduces the weight.

As illustrated in FIG. 4 through FIG. 6B and FIG. 8, the plates 20A and 20B are placed with a gap C provided between the end faces of the edges 20Ab and 20Bb that face each other when in the 180-degree posture. The gap C is positioned so that the hinge base 28 and support plates 22A, 22B fill the gap in the 180-degree posture. These hinge base 28 and support plates 22A and 22B are support components that support the rear face 16a of the bendable region R3 of the display 16 that is not supported by the plates 20A and 20B in the 180-degree posture.

The display 16 is fixed to the surfaces of the plates 20A and 20B with adhesive 23A and 23B on the rear face 16A of regions R1 and R2. For instance, the adhesive 23A and 23B of the present embodiment may be double-sided adhesive tape including optically clear adhesive (OCA). For instance, the adhesive 23A and 23B has a thickness of 0.05 mm.

As illustrated in FIG. 6A and FIG. 8, the adhesive 23A and 23B are provided on substantially the entire surfaces 20Aa and 20Ba of the plates 20A and 20B, but are not provided on the surfaces 20Aa and 20Ba of the edges 20Ab and 20Bb. In this application, the edges 20Ab and 20Bb refer to strip-shaped regions including a range of a predetermined width W in X direction from the opposing end faces of the plates 20A and 20B. For instance, when the display 16 is 16.3 inches, the width W may be set to about 5 to 15 mm. Thus, the plates 20A and 20B have strip-shaped non-adhesive regions Ra and Rb formed on the surfaces 20Aa and 20Ba of the edges 20Ab and 20Bb, the regions having a width W and no adhesive 23A, 23B being applied thereto.

As illustrated in FIG. 4 through FIG. 8, the sheet member 21 is placed across the gap C between the edges 20Ab and 20Bb of the plates 20A and plates 20B. The sheet member 21 has a rectangular shape that is narrow in X direction and long in Y direction. The sheet member 21 is placed so that the first end 21a is on the non-adhesive region Ra, which is the surface 20Aa of the edge 20Ab. The sheet member 21 is placed so that the second end 21b is on the non-adhesive region Rb, which is the surface 20Ba of the edge 20Bb. The first end 21a extends in Y direction on the first plate 20A. The second end 21b extends in Y direction on the second plate 20B.

As described above, the non-adhesive regions Ra and Rb are not provided with the adhesive 23A and 23B. Therefore, as illustrated in FIG. 7B, a gap space S for the thickness of adhesive 23A (23B) is defined above the non-adhesive region Ra (Rb). The gap space S is defined between the rear face 16a of the display 16 and the surface 20Aa (20Ba) of 21 is supported the plate 20A (20B). The sheet member 2 between the display 16 and the plates 20A and 20B by inserting its ends 21a and 21b into the corresponding gap spaces S.

The sheet member 21 is not fixed to the display 16 and the plates 20A and 20B, and is therefore free to move relatively in X direction. As illustrated in FIG. 8, a movement allowance M, which is a gap in X direction, is formed between the end 21a (21b) of the sheet member 21 and the end 23Aa (23Ba) of the adhesive 23A (23B). Of the ends of the adhesive 23A and 23B, the ends 23Aa and 23Ba face the gap C. The movement allowance M is a gap for allowing the sheet member 21 to move relatively in X direction.

The electronic apparatus 10 of this embodiment is configured so that the center of rotation between the chassis 12A and 12B coincides with the surface of the display 16 (display surface 16*b*). This is for preventing the display 16 from being damaged or malfunctioning due to expansion and contraction forces when the chassis 12A and 12B are rotated. Thus, the sheet member 21, located below the display 16 and outside the center of rotation between the chassis 12A and 12B, undergoes expansion and contraction motions. Then, the sheet member 21 in this embodiment is configured to be movable in X direction by the movement allowance M. This configuration suppresses deformation of the sheet member 21 such as waving and wrinkling when subjected to such expansion and contraction motions. This also prevents the sheet member 21 from deforming into an unintended shape and affecting the bending shape of the display 16.

Preferably, the sheet member 21 has a thickness that is approximately the same as the thickness of the adhesive 23A and 23B, which is the thickness of the gap space S (e.g., 0.05 mm). This is because the ends 21*a* and 21*b* of the sheet member 21 are stably supported in the gap space S. Taking into consideration the sliding of the sheet member 21 relative to the display 16 and the plates 20A and 20B, the thickness of the sheet member 21 may be slightly thicker than the thickness of the gap space S.

As illustrated in FIG. 9, the sheet member 21 of this embodiment may be a laminated sheet having a first sheet 50 made of a metal and a second sheet 51 made of a metal different from that of the first sheet 50.

The first sheet 50 is a stainless steel sheet, for example. The second sheet 51 is a copper or aluminum sheet, for example. The second sheet 51 may be a copper alloy or an aluminum alloy sheet. The second sheet 51 has an outer shape that is the same as or slightly smaller than the first sheet 50. For instance, the entire surface of the second sheet 51 is fixed to one face of the first sheet 50 with thin double-sided adhesive tape. For instance, in this embodiment, the first sheet 50 has a thickness of 0.03 mm, and the second sheet 51 has a thickness of 0.02 mm. Note that the double-sided adhesive tape used for stacking the sheets 50 and 51 has a thickness of 0.01 mm or less, for example. Therefore, the thickness of the sheet member 21 is about 0.05 mm to 0.06 mm.

Preferably, the sheet member 21 is placed so that the first sheet 50 including a stainless steel sheet is on the rear face 16*a* of the display 16. The display 16 includes the rear sheet 42 that is also made of stainless steel on the rear face 16*a*. If the second sheet 51, that is, the copper sheet softer than stainless steel, is placed there, this soft second sheet 51 will slide against the rear sheet 42. Then, the second sheet 51 may be damaged by the edges of the holes 42*a* or may generate abnormal noise, and smooth movement of the sheet member 21 may be hindered. The first sheet 50 including stainless steel sheet is almost undamaged by the edges of the holes 42*a* of the rear sheet 42, and is unlikely to get caught. For this reason, the sheet member 21 is preferably placed so that the first sheet 50 made of the same material as the rear sheet 42 comes in contact with the rear sheet 42.

The sheet member 21 is allowed to move in X direction by a distance of the movement allowance M, but does not move any further than that because the end 21*a* (21*b*) is locked by the end 23Aa (23Ba) of the adhesive 23A (23B). This means that the ends 21*a* and 21*b* of the sheet member 21 will not fall into the gap C.

If the sheet member 21 is free to move in Y direction, this does not contribute to the expansion and contraction motion described above. Instead, if the sheet member 21 moves in Y direction, it may be misaligned while protruding from the Y-direction end faces of the plates 20A and 20B.

Thus, as illustrated in FIG. 6A through FIG. 9, the sheet member 21 may be configured to have protrusions 52 and 53. The protrusions 52 and 53 protrude outward from the second end 21*b*. For instance, the protrusion 52 is a semi-circular protrusion. For instance, the protrusion 53 is a rectangular protrusion.

The end 23Ba of the second adhesive 23B facing the second end 21*b* has recesses 54 and 55, in which the protrusions 52 and 53 are placed. The recesses 54 and 55 are recessed inward from the end 23Ba. For instance, the recess 54 is a semicircular recess. For instance, the recess 55 is a rectangular recess.

The recesses 54 and 55 have a width in X direction that is greater than the width of the protrusions 52 and 53 in X direction. These dimensional differences are the movement allowance M to allow relative movement of the sheet member 21 in X direction. In contrast, the recesses 54 and 55 have a width in Y direction that is substantially identical to that of the protrusions 52 and 53 in Y direction. This prevents the sheet member 21 from being misaligned in Y direction because the recess 54 prevents the protrusion 52 from moving in Y direction and the recess 55 prevents the protrusion 53 from moving in Y direction. Therefore, the protrusions 52 and 53 are preferably formed in the first sheet 50, which has a higher rigidity than the second sheet 51. The protrusions 52 and 53 may be formed in the second sheet 51 or in the sheet 50 and 51.

In this way, the protrusions 52 and 53 have different shapes and the recesses 54 and 55 have different shapes. This also prevents the sheet member 21 from being installed in the wrong position relative to the plates 20A and 20B. That is, the protrusion 52 is fitted into the recess 54, and the protrusion 53 is fitted into the recess 55. Then, the sheet member 21 surely is in an installation position in which the first sheet 50 is placed on the rear sheet 42, thereby improving the manufacturing efficiency. The protrusions 52 and 53 and the recesses 54 and 55 may be provided at the first end 21*a*, or may be provided at each of the ends 21*a* and 21*b* as appropriate.

As described above, the display assembly 15 in this embodiment includes the sheet member 21 that spans the gap C between the plates 20A and 20B. The sheet member 21 is configured so that the first end 21*a* is supported between the surface 20Aa of the edge (first edge) 20Ab of the first plate 20A and the rear face 16*a* of the display 16. The sheet member 21 is configured so that the second end 21*b* is supported between the surface 20Ba of the edge (second edge) 20Bb of the second plate 20B and the rear face 16*a* of the display 16. This allows the sheet member 21 to support the rear face 16*a* of the bendable region R3 while spanning the gap C when the display 16 is in the 180-degree posture.

Thus, the display assembly 15 stably supports and reinforces the rear face 16*a* of the display 16 at the bendable region R3 with the sheet member 21. With this configuration, the display assembly 15 mounted on the electronic apparatus 10 suppresses poor touch operational feel or problems caused by a pen being dropped, for example, also when the rear face of the bendable region R3 cannot be supported by a planar member. Note that the electronic apparatus 10 equipped with the display assembly 15 of the present embodiment includes the hinge base 28, which is a support component supporting the rear face 16*a* of the display, and the hinge base 28 has a step on the support face 28*a*. However, the display assembly 15 including the sheet member 21 prevents this step from being directly transmitted to the display 16. As a result, the bendable display 16 can be stably supported, and defects when foreign objects fall also can be suppressed.

Preferably, the sheet member 21 is movable relative to the plates 20A and 20B and the display 16 in the direction where the plates 20A and 20B are placed side by side (i.e., X direction). This prevents deformation such as waving or wrinkling of the sheet member 21 that receives the inner radius difference at a position away from the center of bending when the bendable region R3 of the display 16 is bent. Only one of the ends 21*a*, 21*b* of the sheet member 21 may be free to move and the other may be fixed to the plate 20A or 20B. This configuration also deals with the inner radius difference. Preferably, however, both ends 21*a* and 21*b* of the sheet member 21 are left in a movable state. If one of the ends 21*a* and 21*b* is fixed, the sheet member 21 will press against the bendable region R3 of the display 16, which has a substantially bell shape as illustrated in FIG. 5 when bent, thereby affecting the bell shape and possibly causing a malfunction of the display 16.

Preferably, the sheet member 21 is a laminated sheet having the first sheet 50 made of a metal, and the second sheet 51 stacked on one face of the first sheet 50 and made of a metal different from that of the first sheet 50. Consider a case in which the sheet member 21 is prepared with a single stainless steel sheet, the same as the first sheet 50. The applicant prepared a prototype of the electronic apparatus 10 that had the sheet member 21 of the single stainless steel sheet, and confirmed that the stainless steel sheet bent and produced a crackling noise when repeating the bending operation, depending on the thickness of the sheet member 21 and the configuration of the hinge device 14 connecting the chassis 12A and 12B.

Therefore, the sheet member 21 is preferably a laminated sheet of two different metals. The present applicant also confirmed that the generation of the above-mentioned abnormal noise was suppressed because the sheets 50 and 51 were made of different metals and had different vibration frequencies. The sheet member 21 may include a single sheet. This is because such a single sheet also may be capable of suppressing abnormal noise, depending on the thickness of the sheet and the configuration of the hinge device 14, and exerts the sufficient effect of supporting the display 16.

Preferably, the sheet member 21 is configured so that the first sheet 50 is a stainless steel sheet, and the second sheet 51 is a copper or aluminum sheet. This configuration allows the sheets 50 and 51 to be formed extremely thin, while supporting the display 16 stably and also suppressing abnormal noise. As described above, when the display 16 has the rear sheet 42, the first sheet 50 of the sheet member 21, which is a stainless steel sheet that is more rigid and slippery than a copper sheet or an aluminum sheet, preferably is placed on the rear sheet 42.

The present invention is not limited to the above-described embodiments, and can be modified freely without deviating from the scope of the present invention.

The above describes the electronic apparatus 10 that is foldable into half like a book as an example. Other than the configuration of folding the chassis of the same shape double, the present invention is applicable to various configurations including: a double door configuration in which small chassis are foldably connected to the left and right edges of a large chassis; an S-shaped folding configuration in which chassis with different folding directions are connected to the left and right edges of a single chassis; and a J-shaped folding configuration in which a small chassis is foldably connected to one of the left and right edges of a large chassis. The number of connected chassis may be four or more. In this case, the display assembly 15 may be configured in accordance with the connection structure of such chassis.

The invention claimed is:

1. A display assembly comprising: a first plate having a first edge; a second plate having a second edge, the second plate being rotatable relative to the first plate into a first posture in which the second plate is disposed relative to the first plate with surface normal directions of the first and second plates placed side by side to the left and right, and into a second posture in which the first plate and the second plate are stacked with the surface normal directions overlapping, whereby the second plate being disposed with a gap is between the second edge and the first edge in the first posture; a display having a sheet shape extending between the first plate and the second plate, the display having: a first region adjacent to the first plate and fixed to a part of a surface of the first plate that excludes at least the first edge; a second region adjacent to the second plate and fixed to a part of a surface of the second plate that excludes at least the second edge; and a bendable region between the first region and the second region, wherein the bendable region spans the gap; and a sheet member having a first end supported between a surface of the first edge and a rear face of the display, and having a second end supported between a surface of the second edge and the rear face of the display, thus supporting the rear face of the bendable region of the display while spanning the gap in the first position; wherein: the sheet member includes a laminated sheet including: a first sheet including a metal; and a second sheet stacked on one face of the first sheet and including a metal different from the metal of the first sheet.

2. The display assembly according to claim 1, wherein: the first sheet includes a stainless steel sheet, and the second sheet includes a copper or aluminum sheet.

3. The display assembly according to claim 2, wherein:
the display includes:
a display main body configured to display images; and
a stainless-steel rear sheet covering a rear face of the display main body and extending from the first region to the second region,
wherein the stainless-steel rear sheet has a plurality of holes at least at a part overlapping with the rear face of the bendable region, and
wherein the sheet member is disposed so that the first sheet contacts with the stainless-steel rear sheet.

4. The display assembly according to claim 1, wherein:
the sheet member is movable relative to the first plate, the second plate and the display in a direction where the first and second plates are disposed side by side.

5. The display assembly according to claim 4, wherein:
the first region is fixed with a first adhesive disposed on the surface of the first plate that excludes at least the surface of the first edge,
the second region is fixed with a second adhesive disposed on the surface of the second plate excluding at least the surface of the second edge,
the first end is in a gap space between the surface of the first edge and the rear face of the display, wherein the gap space is a thickness of the first adhesive, and
the second end is inserted into another gap space between the surface of the second edge and the rear face of the display, wherein the another gap space is a thickness of the second adhesive.

6. The display assembly according to claim 5, wherein:

at least one of the first adhesive and the second adhesive has a recess in a part of an end thereof facing the gap, and at least one of the first end and the second end of the sheet member facing the recess has a protrusion to be inserted into the recess with a movement allowance in the direction when the first and second plates are disposed side by side.

7. An electronic apparatus comprising: a first chassis; a second chassis adjacent to the first chassis, the second chassis being rotatable relative to the first chassis into a first posture in which the second chassis is disposed relative to the first chassis with surface normal directions of the first and second chassis disposed side by side to the left and right, and into a second posture in which the first chassis and the second chassis are stacked with the surface normal directions overlapping; a first plate having a first edge and supported by the first chassis; a second plate supported by the second chassis, and having a second edge, the second edge being disposed with a gap from the first edge in the first posture; a display having a sheet shape extending between the first plate and the second plate, the display having: a first region adjacent to the first plate and fixed to a part of a surface of the first plate that excludes at least the first edge; a second region adjacent to the second plate and fixed to a part of a surface of the second plate that excludes at least the second edge; and a bendable region between the first region and the second region, wherein the bendable region spans the gap, so that the bendable region is bent with relative rotation between the first chassis and the second chassis; and a sheet member having a first end supported between a surface of the first edge and a rear face of the display and having a second end supported between a surface of the second edge and the rear face of the display, thus supporting the rear face of the bendable region of the display while spanning the gap in the first posture; the sheet member includes a laminated sheet including: a first sheet including a metal; and a second sheet stacked on one face of the first sheet and including a metal different from the metal of the first sheet.

8. The electronic apparatus according to claim 7, further comprising a support that extends along adjacent ends of the first and second chassis so as to span the adjacent ends, wherein the support fills the gap in the second posture, and supports the rear face of the bendable region with the sheet member in between.

* * * * *